(12) United States Patent
Hollingsworth (10) Patent No.: US 7,048,103 B2
(45) Date of Patent: *May 23, 2006

(54) HANDLE FOR CARRYING CASE

(75) Inventor: W. Dale Hollingsworth, Wilton, CT (US)

(73) Assignee: Targus Group International, Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/743,838

(22) Filed: Dec. 24, 2003

(65) Prior Publication Data

US 2004/0134827 A1 Jul. 15, 2004

Related U.S. Application Data

(63) Continuation of application No. 09/931,036, filed on Aug. 17, 2001, now Pat. No. 6,687,955, which is a continuation of application No. 09/697,651, filed on Oct. 27, 2000, now Pat. No. 6,390,297, which is a continuation of application No. 09/493,548, filed on Jan. 28, 2000, now Pat. No. 6,237,766.

(51) Int. Cl.
*A45C 1/02* (2006.01)
*B25D 25/28* (2006.01)

(52) U.S. Cl. .................. 190/117; 190/115; 16/114.1; 16/408; 150/109; 383/15

(58) Field of Classification Search ........... 190/117, 190/115, 116, 121, 903; 383/15–17; 150/107–109
See application file for complete search history.

(56) References Cited

U.S. PATENT DOCUMENTS

| 910,619 | A | * | 1/1909 | Weidermann | 150/107 |
|---|---|---|---|---|---|
| 1,046,843 | A | * | 12/1912 | Olpp | 150/107 |
| 1,372,126 | A | | 3/1921 | Dunham, Jr. | |
| 1,374,126 | A | | 4/1921 | Walter | |
| 1,444,112 | A | | 2/1923 | Davis | |
| 1,556,352 | A | * | 10/1925 | Ritter | 383/34 |
| 1,658,174 | A | | 2/1928 | Russell | |
| 1,826,976 | A | | 10/1931 | Wright | |
| 1,889,765 | A | | 12/1932 | Switkes | |
| 2,083,029 | A | * | 6/1937 | Lowy | 150/105 |
| 2,110,163 | A | * | 3/1938 | Lobel | 150/105 |
| 2,170,841 | A | * | 8/1939 | Thies et al. | 383/15 |

(Continued)

FOREIGN PATENT DOCUMENTS

EP 0 797 939 A2 10/1997

(Continued)

*Primary Examiner*—Tri M. Mai
(74) *Attorney, Agent, or Firm*—Sterne, Kessler, Goldstein & Fox PLLC (57) ABSTRACT

A carrying case for electronic equipment, such as a portable computer, includes back, front, top, bottom and side walls defining an interior including a compartment for receiving electronic equipment defined between a wall surface and a floating panel of the carrying case. The floating panel is selectively movable linearly toward and away from the wall surface to adjust the size of the compartment in accordance with the size of the electronic equipment received therein. A securing mechanism within the interior resiliently biases the floating panel toward the wall surface and provides a shock or impact absorbing effect for the electronic equipment. The carrying case has a handle including first and second handle portions rotatable between an engaged position wherein the handle portions are in abutment and a disengaged position wherein the handle portions are separated from one another. The first and second handle portions are configured to automatically matingly engage one another when rotated into abutment.

39 Claims, 6 Drawing Sheets

U.S. PATENT DOCUMENTS

| | | | |
|---|---|---|---|
| 2,181,587 A | 11/1939 | Plotkin | |
| 2,316,328 A | 4/1943 | Guenther et al. | |
| 2,574,146 A * | 11/1951 | Gottesman | 150/107 |
| 2,589,438 A | 3/1952 | Schneider | |
| 2,708,989 A | 5/1955 | Bogdanski | |
| 2,769,474 A * | 11/1956 | Klotz | 190/115 |
| 2,771,167 A | 11/1956 | Lifton | |
| 2,800,940 A | 7/1957 | Riesebeck | |
| 2,908,362 A | 10/1959 | Burtchaell | |
| 2,913,080 A | 11/1959 | Louik et al. | |
| D188,582 S | 8/1960 | Koffler | |
| 3,023,868 A | 3/1962 | Koffler | |
| 3,115,228 A * | 12/1963 | Louik et al. | 16/409 |
| 3,115,229 A | 12/1963 | Erhard | |
| 3,265,168 A | 8/1966 | Erhard | |
| 3,500,973 A | 3/1970 | Bush | |
| 3,529,317 A | 9/1970 | Schwarzkopf | |
| 3,531,822 A | 10/1970 | Bush | |
| 3,656,594 A | 4/1972 | Marks et al. | |
| 3,692,155 A | 9/1972 | Laurita | |
| 3,698,404 A | 10/1972 | Greco | |
| 3,813,729 A | 6/1974 | Szabo et al. | |
| 3,912,055 A | 10/1975 | Malooly | |
| 3,912,140 A | 10/1975 | Franges | |
| 3,944,033 A | 3/1976 | Simson | |
| 4,189,037 A | 2/1980 | Szabo | |
| 4,212,377 A | 7/1980 | Weinreb | |
| 4,261,078 A | 4/1981 | Edwards et al. | |
| 4,336,883 A | 6/1982 | Krug et al. | |
| 4,339,039 A | 7/1982 | Mykleby | |
| 4,340,990 A | 7/1982 | Seynhaeve | |
| 4,364,150 A | 12/1982 | Remington | |
| 4,478,450 A | 10/1984 | Picozza | |
| 4,514,876 A | 5/1985 | Houlberg | |
| 4,707,883 A | 11/1987 | Irani et al. | |
| 4,907,633 A * | 3/1990 | Eckstein | 150/105 |
| 5,010,988 A | 4/1991 | Brown | |
| 5,160,001 A | 11/1992 | Marceau | |
| 5,210,904 A | 5/1993 | Pratt | |
| 5,217,119 A | 6/1993 | Hollingsworth | |
| 5,249,653 A | 10/1993 | King | |
| 5,469,945 A | 11/1995 | Jserng | |
| 5,494,157 A | 2/1996 | Golenz et al. | |
| 5,524,754 A | 6/1996 | Hollingsworth | |
| 5,622,262 A | 4/1997 | Sadow | |
| 5,624,035 A | 4/1997 | Kim | |
| 5,676,223 A | 10/1997 | Cunningham | |
| 5,725,090 A | 3/1998 | Vermillion et al. | |
| 5,755,329 A | 5/1998 | Sadow | |
| 5,762,170 A | 6/1998 | Shyr et al. | |
| 5,775,497 A | 7/1998 | Krulik | |
| 5,808,865 A | 9/1998 | Alves | |
| 5,819,942 A | 10/1998 | Sadow | |
| 5,829,099 A | 11/1998 | Kopelman et al. | |
| D403,151 S * | 12/1998 | Heredos-Formby | D3/246 |
| 5,884,768 A | 3/1999 | Fox | |
| 5,909,759 A | 6/1999 | Tanaka et al. | |
| 5,909,806 A | 6/1999 | Fischel et al. | |
| 5,954,170 A | 9/1999 | Chisholm | |
| 5,967,270 A | 10/1999 | Shyr | |
| 5,996,180 A | 12/1999 | Eisenzopf | |
| 6,073,770 A | 6/2000 | Park | |
| 6,105,763 A | 8/2000 | Saetia | |
| 6,105,764 A | 8/2000 | Scicluna et al. | |
| 6,105,766 A | 8/2000 | Chuang | |
| 6,109,434 A | 8/2000 | Howard, Jr. | |
| 6,131,734 A | 10/2000 | Hollingsworth et al. | |
| 6,237,766 B1 | 5/2001 | Hollingsworth | |
| 6,338,180 B1 | 1/2002 | Massard | |
| 6,390,297 B1 | 5/2002 | Hollingsworth | |
| 6,499,187 B1 | 12/2002 | Hollingsworth | |
| 6,687,955 B1 | 2/2004 | Hollingsworth | |

FOREIGN PATENT DOCUMENTS

| | | |
|---|---|---|
| GB | 161117 | 4/1921 |

* cited by examiner

HANDLE FOR CARRYING CASE

This application is a continuation of application Ser. No. 09/931,036, filed Aug. 17, 2001, now U.S. Pat. No. 6,687,955, which is a continuation of application Ser. No. 09/697,651, filed on Oct. 27, 2000, now U.S. Pat. No. 6,390,297, which is a continuation of application Ser. No. 09/493,548, filed on Jan. 28, 2000, now U.S. Pat. No. 6,237,766.

BACKGROUND OF THE INVENTION

1. Field of the Invention:

The present invention relates generally to carrying cases for portable computers and, more particularly, to carrying cases for portable computers wherein the computers are protected against damage from impacts.

2. Brief Description of the Related Art:

Portable computers such as laptop or notebook computers have become increasingly popular due to their transportability, allowing such computers to be used in various places during and/or following transport. To enhance transportability, portable computers are typically designed to minimize size and weight and, therefore, do not usually include excess room for accommodating shock or impact absorbing materials or structure to protect sensitive components of the computers against damage from impacts. As a result, portable computers are vulnerable to damage if dropped, bumped against other objects or otherwise jarred or impacted, as often occurs during transport.

Carrying cases have been proposed for portable computers incorporating foam padding or other structure to protect the computers against damage from impacts. Exemplary carrying cases for portable computers are disclosed in U.S. Pat. No. 5,010,988 to Brown, U.S. Pat. No. 5,160,001 to Marceau, U.S. Pat. No. 5,217,119 to Hollingsworth, U.S. Pat. No. 5,494,157 to Golenz et al, U.S. Pat. No. 5,524,754 to Hollingsworth, U.S. Pat. No. 5,622,262 to Sadow, U.S. Pat. No. 5,624,035 to Kim, U.S. Pat. No. 5,676,223 to Cunningham, U.S. Pat. No. 5,755,329 to Sadow, U.S. Pat. No. 5,762,170 to Shyr et al, U.S. Pat. No. 5,775,497 to Krulik, U.S. Pat. No. 5,819,942 to Sadow, U.S. Pat. No. 5,909,806 to Fischel et al, U.S. Pat. No. 5,967,270 to Shyr, and European Patent No. 0 797 939 A2.

Some carrying cases for portable computers include protective slings therein forming computer receiving compartments for receiving a portable computer. Such slings are typically formed by opposed walls that are spaced from one another at their top ends and connected to one another at their bottom ends to form a closed base upon which a portable computer is supported. One of the walls is typically pivotable about its bottom end toward the opposed wall to allow the computer to be closely held between the opposed walls. Since the pivotable wall cannot move in its entirety relative to the opposed wall, the computer receiving compartment may be much smaller in width at its bottom than at its top. Accordingly, a computer received in the computer receiving compartment may be too tightly held at the bottom of the compartment and too loosely held at the top of the compartment, thereby possibly damaging the computer or rendering it susceptible to damage from impacts.

In many carrying cases, the structure defining the computer receiving compartment is disposed within a larger storage compartment with the base or bottom of the computer receiving compartment spaced from a bottom wall of the storage compartment. When the storage compartment is used to store objects or items, such as computer accessories, documents, personal effects, etc., such items may enter the vacant space beneath the computer receiving compartment and may thusly be difficult to subsequently locate, access and retrieve.

Conventional carrying cases for portable computers are typically provided with handles for being manually grasped in order to pick up and carry the carrying cases as illustrated by the patents cited above. Various other handles have been proposed for use on carrying cases, luggage, bags, boxes and the like as represented by U.S. Pat. No. Des. 188,582 to Koffler, U.S. Pat. No. 1,374,126 to Walter, U.S. Pat. No. 2,800,940 to Riesebeck, U.S. Pat. No. 2,908,362 to Burtchaelf, U.S. Pat. No. 2,913,080 to Louik et al, U.S. Pat. No. 3,023,868 to Koffler, U.S. Pat. No. 3,115,229 to Erhard, U.S. Pat. No. 3,500,973 to Bush, U.S. Pat. No. 3,529,317 to Schwarzkoph, U.S. Pat. No. 3,531,822 to Bush, U.S. Pat. No. 3,656,594 to Marks et al, U.S. Pat. No. 3,692,155 to Laurita, U.S. Pat. No. 3,813,729 to Szabo et al, U.S. Pat. No. 3,912,140 to Franges, U.S. Pat. No. 3,944,033 to Simson, U.S. Pat. No. 4,261,078 to Edwards et al, U.S. Pat. No. 4,347,990 to Seynhaeve, U.S. Pat. No. 4,364,150 to Remington, U.S. Pat. No. 4,514,876 to Houlberg, and U.S. Pat. No. 4,707,883 to Irani et al.

Many handles used on carrying cases for portable computers are formed of pivotable handle portions that do not tend to stay in an upstanding position when the carrying case is set down in an upright position on a support surface. Rather, the handle portions tend to pivot downwardly toward the carrying case of their own accord. Accordingly, each time such a handle is to be grasped, the handle portions thereof must first be manually pivoted to the upstanding position. This can prove to be very annoying and time consuming for the user, particularly where the carrying case must be set down and picked up numerous times. A further disadvantage of such handles is that the handle portions, when pivotally moved to the upstanding position, and manually grasped together with a single hand, present conspicuous seams, separations or hard edges that are felt by the hand and result in discomfort. Also, conventional handles for carrying cases for portable computers do not effectively distribute weight over the underside of the hand and/or tend to exert undesired pressure on the outer sides of the index and pinkie fingers.

SUMMARY OF THE INVENTION

Accordingly, it is a primary object of the present invention to overcome the aforementioned disadvantages of prior art carrying cases for portable computers.

Another object of the present invention is to provide a carrying case for a portable computer wherein a compartment is defined in the carrying case between a wall surface and a floating panel that is movable linearly toward and away from the wall surface to adjust the size of the compartment.

A further object of the present invention is to retain a portable computer in a compartment defined in a carrying case between a wall surface and a floating panel that is movable, in its entirety, toward and away from the wall surface to provide a compartment of adjustable width.

It is also an object of the present invention to permit adjustment of both the width of a computer receiving compartment and the width of a storage compartment of a carrying case for a portable computer via linear movement of a floating panel of the carrying case.

The present invention also has as an object to provide a carrying case for a portable computer with a floating panel that is linearly movable relative to a wall surface of the carrying case to hold a computer therebetween and is resiliently biased toward the wall surface to provide an impact absorbing effect for the computer.

An additional object of the present invention is to provide a carrying case for a portable computer with a handle made up of pivotable handle portions tending to remain in an upstanding, engaged position when the carrying case is supported in an upright position on a support surface.

Yet another object of the present invention is to provide a carrying case for a portable computer with a handle made up of handle portions that are pivotally movable to an engaged position providing a smooth, seamless feel for a hand grasping the handle.

A still further object of the present invention is to enhance the comfort experienced by the hand of a user when grasping a handle of a carrying case for a portable computer.

Some of the advantages of the present invention are that the carrying case can contain various shock or impact absorbing mechanisms, no vacant space is present between the computer and the bottom wall of the carrying case, the storage compartment does not include any difficult to access areas, the openings for the computer receiving compartment and the storage compartment have separate, independently operable closures, respectively, the wall surface and a surface of the floating panel facing into the computer receiving compartment are padded to protect the portable computer, a top restraint is provided at a top of the computer receiving compartment to resiliently bias the computer toward the bottom wall and provide a shock or impact absorbing effect, and various storage pockets can be provided on the floating panel and/or on other walls of the carrying case.

These and other objects, advantages and benefits are realized with the present invention as generally characterized in a carrying case for a portable computer, the carrying case having a back wall and a front wall connected to one another by a top wall, a bottom wall and a pair of side walls define an interior. A compartment for receiving a portable computer or other delicate electronic equipment is defined in the interior between a wall surface and a floating panel of the carrying case. The floating panel is selectively movable linearly toward and away from the wall surface to allow the size of the compartment to be adjusted in accordance with the size of the computer or other electronic equipment received therein. The carrying case includes a securing mechanism in the interior for resiliently biasing the floating panel toward the wall surface, allowing the computer or other electronic equipment to be gently, compressively held between the wall surface and the floating panel. The securing mechanism includes a securing member releasably connected between the wall surface and the floating panel, with the securing member being capable of stretching to effect absorption of shock or impact that would otherwise be experienced by the computer or other electronic equipment. The carrying. case also includes a shock or impact absorbing mechanism which may comprise a pair of compressible side bumpers at opposite sides of the compartment and at least one compressible bottom bumper at the bottom of the compartment. The side bumpers extend in the same direction as the side walls such that the computer or other electronic equipment received in the compartment is disposed between the side bumpers. The bottom bumper extends in the same direction as the bottom wall such that the computer or other electronic equipment received in the compartment is supported thereon when the carrying case is in an upright position. The bumpers are capable of compressing to absorb shock or impact that would otherwise be experienced by the computer or other electronic equipment. The carrying case has a top restraint for resiliently biasing the computer or other electronic equipment toward the bottom wall and includes a restraining member releasably connected between the wall surface and the floating panel at a top end of the compartment. The restraining member is capable of stretching to absorb shock or impact that would otherwise be experienced by the computer or other electronic equipment.

A handle for the carrying case includes first and second handle portions mounted to the top wall and including arcuate segments, respectively, rotatable relative to the top wall. The arcuate segments are rotatable between an engaged position, wherein the arcuate segments are in abutment for being grasped together with one hand, and a disengaged position, wherein the arcuate segments are separated from one another. The arcuate segments include inner surfaces, respectively, configured to mate when the arcuate segments are rotated to the engaged position, the inner surface of the first handle portion being configured as a protuberance and the inner surface of the second handle portion being configured as a cavity for receiving the protuberance. Also, the arcuate segments include upper transition surfaces, respectively, from which the inner surfaces extend, and the upper transition surfaces are in abutment in the engaged position. In a preferred embodiment for the handle, the outer surface of the first handle portion is completed by an outer surface of the second handle portion in the engaged position, and no seams or other discontinuous surfaces are presented along a bottom surface of the handle that bears against the hand when the carrying case is picked up and carried via the handle.

These and other objects, advantages and benefits of the present invention will become apparent from the following description of the preferred embodiments taken in conjunction with the accompanying drawings wherein like parts in each of the several figures are identified by the same reference characters.

DESCRIPTION OF THE PREFERRED EMBODIMENTS

Figure 1:
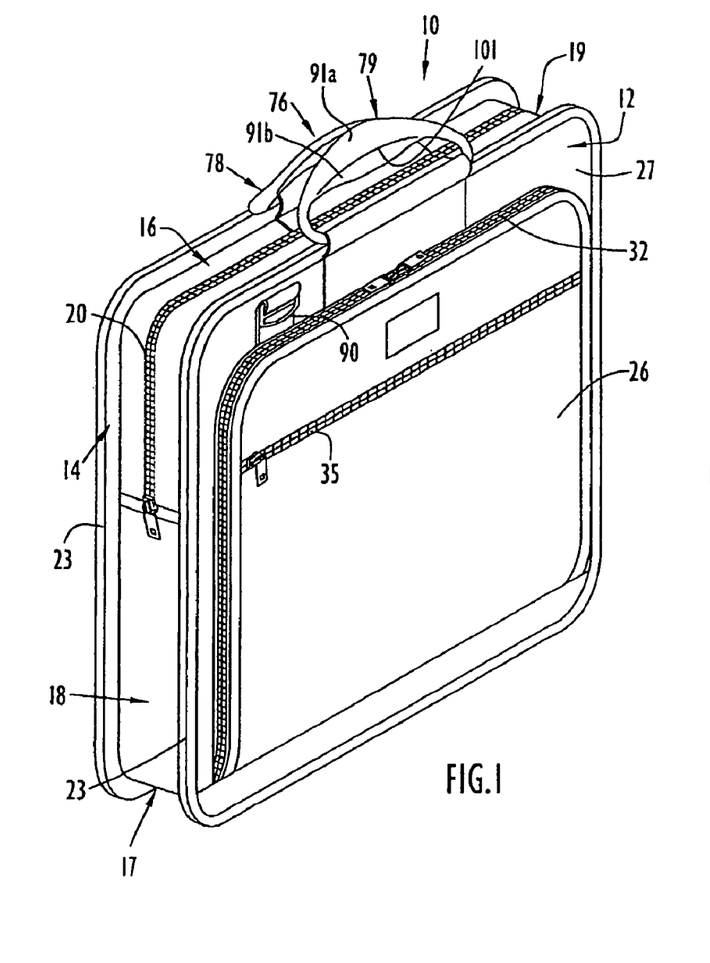
FIG. 1 is a perspective view of a carrying case for a portable computer in accordance with the present invention and illustrating the carrying case in an upright position.
Figure 2:
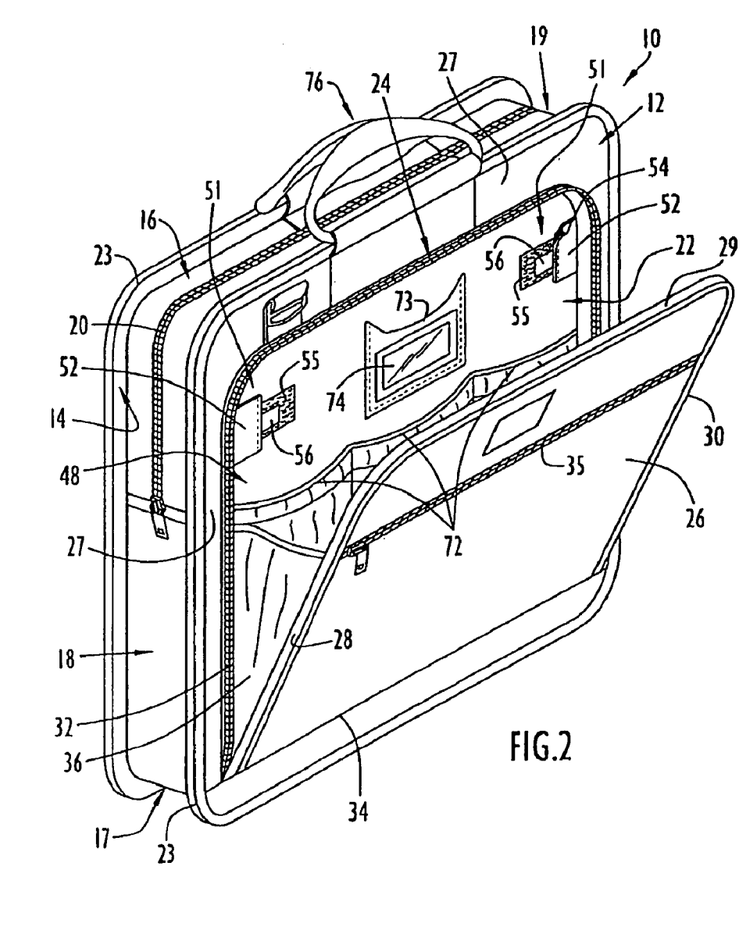
FIG. 2 is a perspective view of the carrying case showing an exterior front flap thereof open to reveal a storage compartment and a floating panel of the carrying case.
Figure 3:
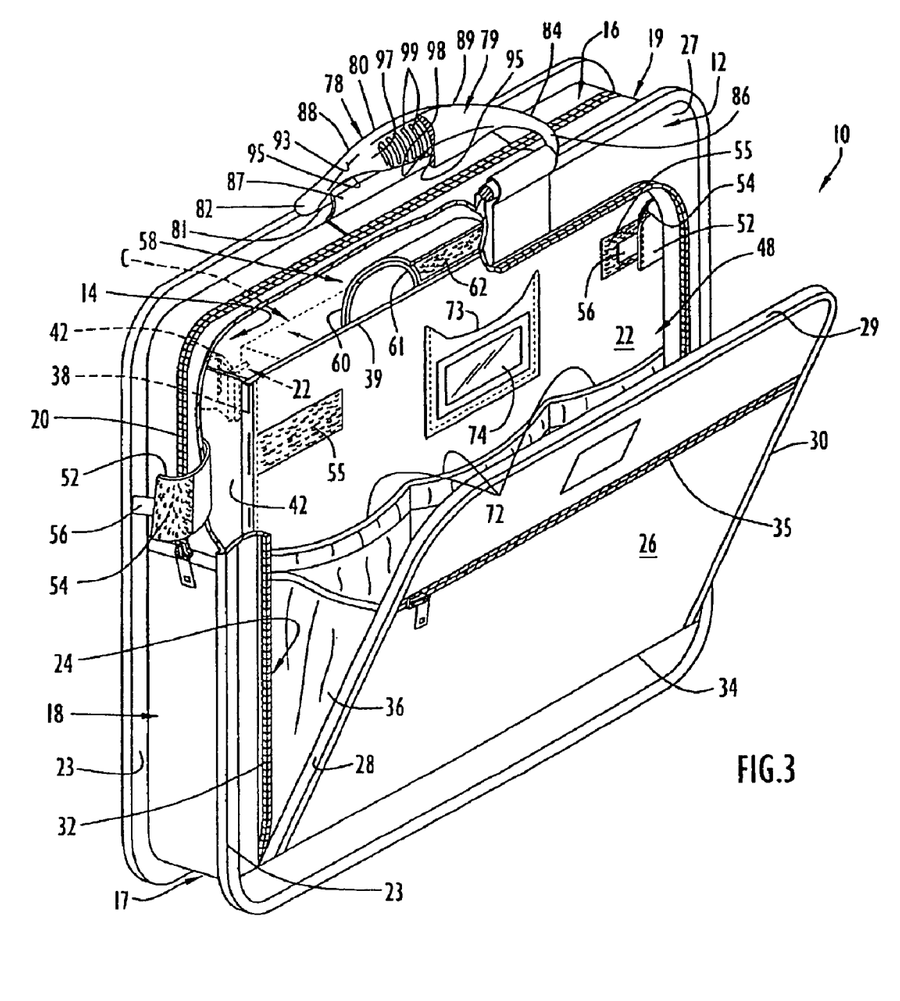
FIG. 3 is a perspective view of the carrying case showing the exterior front flap open and a portion of the carrying case broken away to illustrate adjustability of the floating panel to adjust the width of a computer receiving compartment of the carrying case.

A carrying case 10 for portable computers in accordance with the present invention is best illustrated in FIGS. 1–6 and includes a front wall 12, a back wall 14, top and bottom side walls 16 and 17 and left and right side walls 18 and 19. Front wall 12.and back wall 14, which are typically planar and in parallel or substantially parallel relation, are connected by side walls 16, 17, 18 and 19 to form a generally rectangular frame with a primary opening that is selectively opened and closed by a closure such as a zipper 20. The top side wall 16 has a length extending between the left and right side walls 18 and 19, and the primary opening extends lengthwise along the top side wall and also part way along the left and right side walls. The primary opening, as defined by the length of zipper 20, is intermediate front and back edges of the top, left and right side walls 16, 18 and 19 and extends continuously from a location on the left side wall to a location on the right side wall, such locations being disposed medially along the length of the left and right side walls between the top side wall 16 and the bottom side wall 17. When zipper 20 is closed as shown in FIGS. 1–3, the primary opening is also closed and the front wall, back wall, top and bottom side walls, and left and right side walls cooperate to form an enclosure defining an interior containing a floating or adjustable interior panel 22, shown in FIGS. 2–6. Front and back walls 12 and 14, top and bottom side walls 16 and 17 and left and right side walls 18 and 19 can have any desired configuration to define an interior providing a computer or electronic equipment receiving compartment suitable in size for accommodating a portable computer, such as a laptop or notebook computer, or other delicate electronic instrument or equipment. The front and back walls 12 and 14 can have perimetrical edges 23, respectively, that protrude beyond the top, bottom, left and right side walls, with bottom segments of the perimetrical edges 23 defining a support by which the carrying case 10 may be supported in an upright position on a support surface as shown in FIGS. 1–3. Of course, the perimetrical edges 23 do not have to protrude beyond the top, bottom, left and right side walls, in which case the bottom side wall 17 can define the support by which the carrying case 10 is supported in the upright position on a support surface, and the bottom side wall can be stiffened or rigidified when used for this purpose.

Front wall 12 has an opening 24 therein forming a front or exterior flap 26 circumscribed by a perimetrical border 27 as best shown in FIGS. 2 and 3. The front flap 12 is defined by a rectangular section of front wall 12 and has a left side edge 28 continuous with a top edge 29 which, in turn, is continuous with a right side edge 30. The left side edge 28, top edge 29 and right side edge 30 extend along the opening 24, which is provided with a closure such as a zipper 32 for selectively opening and closing the opening 24. A bottom edge 34 of flap 26 is flexibly, resiliently or pivotally connected or joined to a bottom segment of the perimetrical border 27, allowing movement of the flap 26 outwardly away from the perimetrical border 27 when zipper 32 is open as shown in FIGS. 2 and 3. When the flap 26 is pivoted or moved outwardly away from the perimetrical border 27, the opening 24, which may be considered a secondary opening for the carrying case 10, is thereby opened and provides access to the interior. As shown in FIGS. 2 and 3, the left and right side edges 28 and 30 of flap 26 can be connected to side segments, respectively, of the perimetrical border 27 by left and right connecting members 36, respectively, only the left connecting member 36 being visible in FIGS. 2 and 3. The connecting members are flexible, resilient, collapsible, bendable or foldable, such as being made of fabric with or without preformed pleats or folds, to accommodate outward movement of flap 26. The connecting members 36 can have a width selected to limit movement of flap 26 outwardly from the border 27 and a length selected to retain objects in a storage compartment defined between the front wall 12 and the floating panel 22 as explained further below. If desired, an exterior face of flap 26 can be provided with one or more pockets, with or without closures, the exterior face of flap 26 being shown with a zippered pocket 35. An interior face of flap 26 can be provided with one or more pockets, with or without closures. In a preferred embodiment, the interior face of flap 26 is provided with an open pocket extending the length of the flap.

Figure 4:
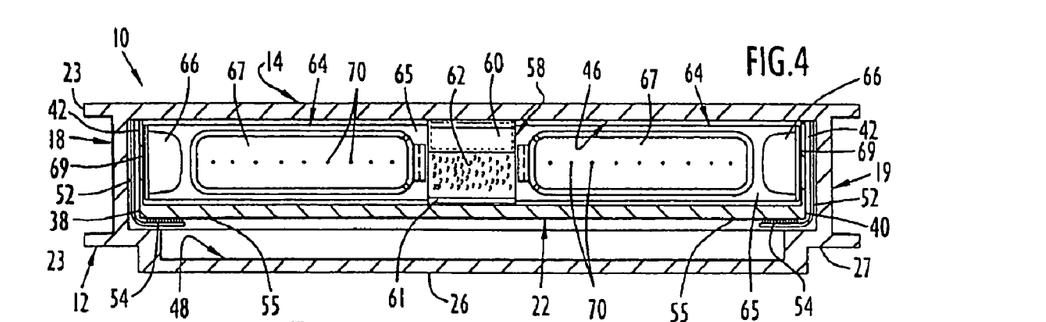
FIG. 4 is a top view, partly in section, of the carrying case showing the floating panel in a position providing a maximum width for the computer receiving compartment.
Figure 5:
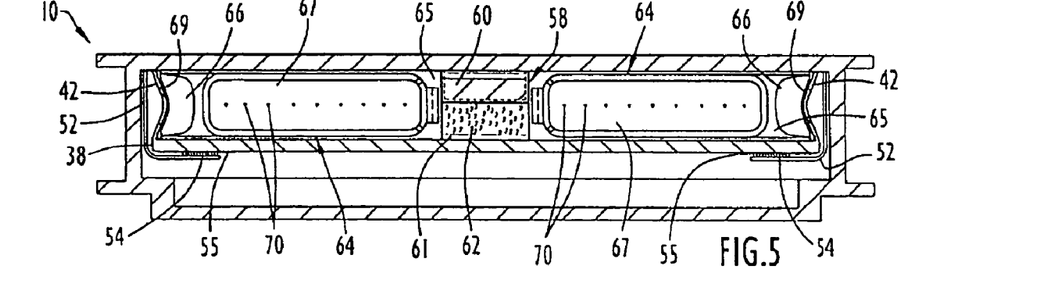
FIG. 5 is a top view, partly in section, of the carrying case showing the floating panel in an adjusted position providing less than the maximum width for the computer receiving compartment.

Floating or adjustable panel 22 is disposed in the interior of carrying case 10 between the front wall 12 and the backwall 14, typically in parallel or substantially parallel relation to the front and back walls. The panel 22 is typically planar and, as best shown in FIGS. 3–5, has a left side edge 38, a top edge 39, a right side edge 40 and a bottom edge 41. The left side edge 38 and right side edge 40 extend in the same direction as side walls 18 and 19 and are connected to the back wall 14 by left and right side panels 42, respectively, having a length extending in the same direction as the left and right side walls 18 and 19. In a preferred embodiment, the side panels 42 have a length extending from the top edge to the bottom edge of panel 22. The bottom edge 41 of floating panel 22 is spaced inwardly, i.e. upwardly, from the bottom side wall 17 a small distance, with the bottom edge 41 being movable relative to the back wall 14 and the bottom side wall 17. The left and right side edges 38 and 40 of panel 22 are spaced inwardly from the left and right side walls 18 and 19 a small distance. The side panels are retractable, flexible, resilient, collapsible, bendable or foldable, such as being made of fabric with or without preformed pleats or folds. In a preferred embodiment, the side panels have one or more preformed fold lines along the length thereof forming pleats or folds when the panel 22 is moved toward the back wall 14 as explained further below. The entire panel 22 is free to move linearly from a first or fully extended position, wherein the panel 22 is disposed a maximum distance from back wall 14 with the side panels 42 straight or fully extended, to a second or adjusted position, wherein the panel 22 is disposed less than the maximum distance from back wall 14 with the side panels 42 retracting, flexing, collapsing, bending or folding to accommodate movement of panel 22 toward the back wall 14.

The panel 22 divides the interior of carrying case 10 into the computer or electronic equipment receiving compartment 46 and the storage compartment 48. The computer receiving compartment 46 is defined between panel 22 and a wall surface of carrying case 10. In the preferred embodiment, the wall surface is formed by an inner surface of an exterior wall of the carrying case and, in particular, by the inner surface of back wall 14. The storage compartment 48 is defined between panel 22 and front wall 12. Access to the computer receiving compartment 46 is best provided by the primary opening, which provides communication with an open top end of the compartment 46. Access to the storage compartment 48 is provided by both the primary and secondary openings. The computer receiving compartment 46, which typically extends parallel to the back and front walls, has a width between panel 22 and the inner surface of back wall 14, and the width of the computer receiving compartment is adjustable via adjustment of panel 22. In particular, the width of side panels 42 between panel 22 and the inner surface of back wall 14 determines the maximum width of the computer receiving compartment 46 since the panel 22 will be spaced the maximum distance from back wall 14 when the pleats of the side panels 42 are fully open and the side panels 42 are straight and fully extended as shown in FIG. 4 and in solid lines in FIG. 3. Accordingly, when the side panels 42 are straight and fully extended, the panel 22 is in the first or fully extended position, which corresponds to the maximum width for the computer receiving compartment 46. In the fully extended position, the top and bottom edges 39 and 41 of panel 22 are spaced from the back wall 14 the same amount, and the pleats or folds of side panels 42 are open. When the panel 22 is adjusted by being moved linearly toward back wall 14 in a direction perpendicular to the back wall and the floating panel, as shown by the arrow in FIG. 3, the width of the computer receiving compartment 46 is decreased. FIG. 3 (in dotted lines) and FIG. 5 illustrate the panel 22 moved to a second or adjusted position wherein the computer receiving compartment 46 has a width less than the maximum width. Since the entire panel 22 is free to move, the top and bottom edges 39 and 41 of the panel move closer to the back wall as the panel is moved toward an adjusted position. The panel 22 can be maintained parallel or substantially parallel to the back wall 14 in the first position as well as various adjusted positions such that the width of the computer receiving compartment can be maintained uniform or constant or substantially uniform or constant between the top and bottom edges 39 and 41 of the panel 22. As the panel 22 is moved from the fully extended position to an adjusted position, the side panels 42 retract in the direction of their width and the pleats or folds of side panels 42 begin to close.

When the carrying case 10 is to be used to transport a portable computer or other delicate electronic instrument or equipment, the computer or other instrument or equipment is positioned in the computer or electronic equipment receiving compartment 46 via the primary opening and the open top end of the compartment 46. FIG. 3 illustrates in dotted lines a portable computer C positioned in the compartment 46 with parallel top and bottom sides of the computer extending in the same direction as front and back walls 12 and 14 and parallel left and right sides of the computer extending in the same direction as side panels 42. The compartment 46 has a bottom end closed by bottom side wall 17, and the computer is supported on the bottom side wall 17, directly or via a cushion interposed between the computer and the bottom side wall, when the case 10 is in the upright position. The floating panel 22 is adjusted, as necessary, to adjust the width of compartment 46 in accordance with the depth of the computer C between the computer top and bottom sides. The floating panel 22 is moved toward the back wall 14 to a selected adjusted position so that the computer C is closely or snugly held between the back wall 14 and the panel 22, with the back wall 14 and panel 22 typically being in abutment with the computer C or other electronic instrument or equipment. The back wall 14 and the panel 22 are preferably rigid or semi-rigid to provide a protective shell for the computer, with the inner surface of back wall 14 and the surface of panel 22 facing into the compartment 46 being covered with soft padding to cushion the computer. The maximum width for the computer receiving compartment is preferably larger than the maximum depth of conventional portable computers to accommodate portable computers of various sizes and to allow the panel 22 to provide a shock or impact absorbing effect as explained further below.

A securing mechanism is provided in carrying case 10 for securing the floating panel 22 in an adjusted position and allowing the panel 22 to move to provide a shock or impact absorbing or cushioning effect for the computer or other delicate electronic instrument or equipment disposed in the compartment 46. The securing mechanism for carrying case 10 includes a pair of securing members 51, one at each side of panel 22, releasably connected between back wall 14 and panel 22. Each securing member 51 includes a stretchable member such as a band 52 of stretchable or elasticized material having a first end secured to back wall 14 and a second end having a fastener 54 thereon for releasable, securing engagement with a fastener 55 provided on panel 22. The fasteners 54 and 55, which can be designed in many various ways, are illustrated as layers of cooperative Velcro™ style hook and loop material with layers 54 of Velcro™ style material on inner surfaces of the second ends of bands 52, respectively, cooperating with layers 55 of Velcro™ style material provided on the outer surface of panel 22 facing into the storage compartment 48. The bands 52 are located proximate the top of the computer receiving compartment 46, and the bands 52 extend forwardly from backwall 14 with each band 52 being disposed between a side panel 42 and a left or right side wall 18 or 19. The bands 52 are of sufficient length to extend the entire width of the side panels 42, to turn the corners at which the side panels 42 are joined to the floating panel 22 and to extend partway along the length of the outer surface of panel 22 for engaging fasteners 55. To facilitate grasping of bands 52, protruding tabs 56 may be provided on the second ends thereof.

Once the floating panel 22 is moved toward the back wall 14, as needed, so that the particular laptop computer C or other electronic equipment is snugly retained between the panel 22 and the back wall 14, the bands 52 are secured to the fasteners 55 with the bands 52 stretched somewhat to resiliently bias the panel 22 into abutment with the computer. The securing members resiliently bias the panel 22 toward the back wall 14 such that the computer C is compressively but gently held between the panel 22 and the back wall 14 without crushing. The back wall 14 and panel 22 limit forward and rearward movement of the computer. However, the stretchable members are capable of stretching as needed to absorb kinetic energy of the computer and thereby cushion the computer when the carrying case 10 is subjected to an impact causing an impact force or impact force component to be exerted on the computer. Accordingly, the securing members 51 stretch to permit movement of panel 22 and to absorb shock and impact that would otherwise be experienced by the computer.

A top restraint 58 is provided in the carrying case 10 for resiliently biasing the computer C or other electronic equipment toward the bottom wall 17 and providing a shock or impact absorbing effect. Top restraint 58 includes a stretchable restraining member releasably connected between the back wall 14 and panel 22 at the open top end of the computer receiving compartment. As best shown in FIGS. 3–5, top restraint 58 includes first and second straps 60 and 61 of stretchable or elasticized material secured to the inner surface of back wall 14 and panel 22, respectively. First strap 60 has a first end connected to the inner surface of back wall 14 at a location centrally disposed between left and right side walls 18 and 19, such location being disposed inwardly of or below the top edge 39 of panel 22. The first strap 60 extends forwardly from the back wall 14 to a second end carrying a fastener, which is a layer of Velcro™ style material, on its bottom surface. Second strap 61 has a first end connected to the surface of panel 22 facing into the computer receiving compartment, the first end of strap 61 being connected to panel 22 at a location corresponding to the location at which the first end of first strap 60 is secured to back wall 14. The second strap 61 extends rearwardly from the panel 22 to a second end carrying a fastener 62, which is a layer of Velcro™ style material, on its top surface for cooperative, releasable securing engagement with the fastener of strap 60.

Once the portable computer C is received in the computer receiving compartment 46 as shown in FIG. 3, the straps 60 and 61 are positioned over an upwardly facing side of the computer. The second ends of the straps 60 and 61 are secured together via the fasteners thereof, with the straps stretched somewhat, such that the restraint extends across the width of compartment 46. The straps 60 and 61 resiliently bias the computer downwardly toward the bottom side wall 17 and are capable of stretching as needed to absorb shock or impact that would otherwise be experienced by the computer. Accordingly, the top restraint 58 provides a shock or impact absorbing or cushioning effect for the computer when the carrying case is subjected to an impact causing an impact force or impact force component to be exerted on the computer. The locations at which the first ends of the straps 60 and 61 are joined to the back wall 14 and the panel 22, respectively, are disposed inwardly of or below the upwardly facing side of the computer C, thusly ensuring a downward bias on the computer.

Carrying case 10 is provided with a shock or impact absorbing mechanism providing an additional shock or impact absorbing or cushioning effect for the computer to avoid damage from impacts. The shock absorbing mechanism of carrying case 10 includes one or more shock absorbing members disposed within and extending along the sides and bottom end of the computer receiving compartment 46. Carrying case 10 has two shock absorbing members 64, each comprising an elongate substrate 65 carrying two cushions or bumpers 66 and 67. Each substrate 65 has a length to extend partway along the length of bottom side wall 17 and partway along the length of one of the left or right side panels 42. More particularly, each substrate 65 extends from a first end near the top of one of the left or right side panels 42 to terminate at a second end near the center of bottom side wall 17. Each substrate 65 has a width the same as or slightly smaller than the maximum width of the computer receiving compartment 46 to be received between the back wall 14 and panel 22. Each substrate 65 has one or more fasteners 69 on a bottom surface thereof by which the substrate is releasably secured to the bottom side wall 17 and/or left or right side panels 42. For shock absorbing members 64, each substrate 65 has two patches 69 of Velcro™ style material at opposite ends of the substrate for releasable securement to the bottom side wall 17 and one of the left or right side panels 42. The bottom side wall 17 and left and right side panels 42 can be provided with complementary patches of Velcro™ style material for cooperative, releasable securement with the patches 69. However, the inner surfaces of-bottom side wall 17 and left and right side panels 42 can be provided or made of a material, such as felt, capable of releasable locking securement with the patches 69, thusly eliminating the need for separate fasteners on the bottom side wall 17 and the left and right side panels 42. If desired, fasteners can protrude laterally from the substrates for releasable securement to the front wall 12 and/or back wall 14 as represented by fastener 69' in FIG. 6.

Figure 6:
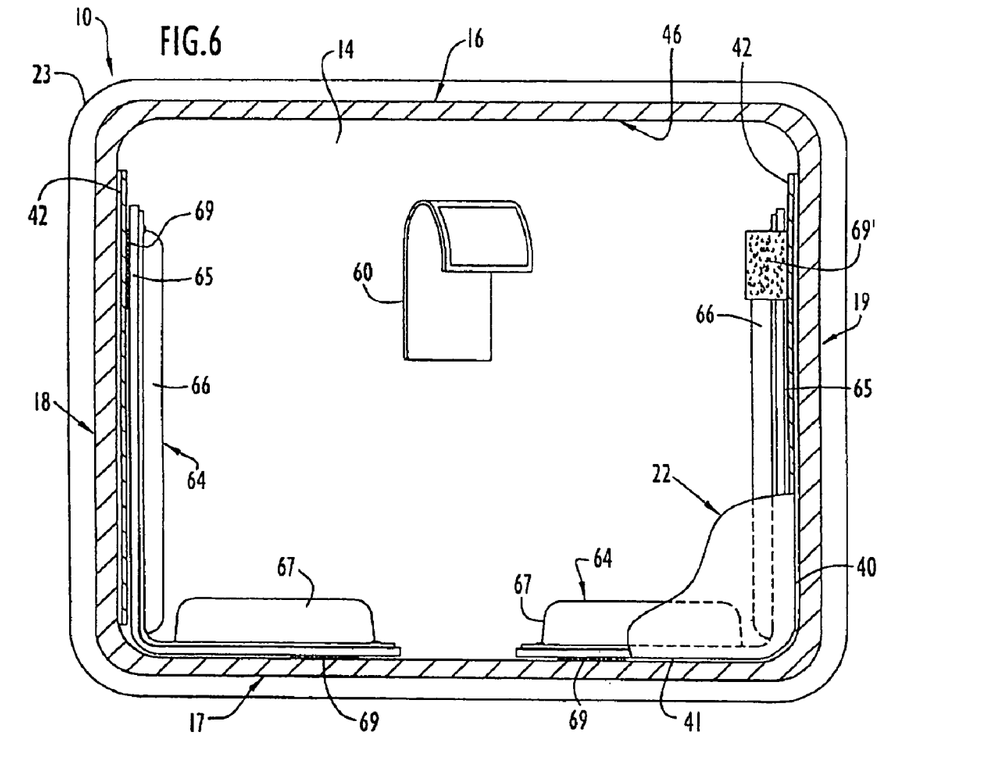
FIG. 6 is a front sectional view of the carrying case illustrating a shock absorbing mechanism of the carrying case.

Cushions 66 and 67 protrude upwardly from a top surface of each substrate 65 and are longitudinally aligned with one another along the length of the corresponding substrate with the cushions 66 and 67 being longitudinally spaced from one another a small distance. Each substrate 65 is bendable at a location between its cushions 66 and 67, allowing the substrate to follow the angle, bend or curve at the corners formed by juncture of the bottom side wall 17 with the left and right side panels 42. When the shock absorbing members 64 are installed in the carrying case 10 as shown in FIGS. 4–6, cushions 66, which are side cushions, extend alongside panels 42, respectively, while cushions 67, which are bottom cushions, extend along bottom side wall 17. The cushions 66 extend in the same direction as the left and right side walls 18 and 19, and are disposed on opposite sides of the compartment 46. The cushions 66 have a length greater than the length of cushions 67 and extend along the left and right side panels 42, respectively, from proximate the first ends of the substrates to the corners formed by the juncture of the left and right side panels 42 with the bottom side wall 17. The cushions 67 extend in the same direction as bottom side wall 17 and are disposed at the bottom of the compartment 46.

Shock absorbing members 64 are of the type disclosed in co-pending U.S. patent application Ser. No. 09/236,292 filed Jan. 22, 1999, the disclosure of which is incorporated herein by reference. Each cushion comprises one or more bodies of compressible material enclosed in a pliable cover having vents 70 therein controlling the release of air when the body or bodies of compressible material is/are compressed in response to an impact force or impact force component to which the computer is subjected, the cushions naturally expanding to their original state after the impact force or force component is removed. Since the shock absorbing members 64 are of the type for which the structure and operation thereof is described in detail in the prior application incorporated herein by reference, such detailed description will not be reiterated herein.

When the computer C is received in the computer receiving compartment 46, the computer is disposed on the bottom cushions 67 when the carrying case is in the upright position and is disposed between the side cushions 66. The cushions 66 limit lateral movement of the computer C but are capable of compressing to absorb shock or impact that otherwise would be experienced by the computer when the carrying case is subjected to an impact. The cushions 67 and top restraint 58 limit upward and downward movement of the computer C while providing a shock or impact absorbing effect for the computer due to the compressibility of cushions 67 and the stretchability of straps 60 and 61. The substrate 65 and the covers are made of pliable or flexible material with the substrates and/or covers flexing or deforming and the cushions compressing as needed to accommodate adjustment of panel 22.

The perimetrical border 27, the back wall 14, the floating panel 22 and the perimetrical edges 23 are preferably made of rigid or semi-rigid material or can be made of flexible materials provided with suitable stiffeners. The top and bottom side walls 16 and 17, the left and right side walls 18 and 19 and the flap 26 are preferably made of flexible material such as durable synthetic fabric. The surface of panel 22 facing into the storage compartment 48 can be provided with one or more pockets, with or without closures. As shown in FIG. 3, the surface of panel 22 facing into compartment 48 is provided with three open pockets 72 arranged in side by side relation between left and right side edges 38 and 40 and a smaller, centrally located open pocket 73. The pocket 73 has a transparent window 74 and is adapted in size and shape to receive a single business card or a plurality of business cards arranged in a stack, with the single business card or the topmost one of the plurality of business cards being visible through the window 74. In a preferred embodiment for carrying case 10, an outer surface of back wall 14 is provided with an open pocket (not shown) extending the entire or substantially the entire length of back wall 14 between side walls 18 and 19, and having a height extending about halfway up the back wall 14. The carrying case may be provided with securing devices such as D-rings, one D-ring 90 being visible in FIG. 1, at suitable locations for attachment of a shoulder strap thereto. The carrying case can be provided with various shock or impact absorbing mechanisms and/or restraints for limiting movement of the computer and/or absorbing shocks and impacts. The carrying case 10 can be provided with additional features and/or modifications, including those disclosed in U.S. Pat. Nos. 5,217,119 and 5,524,754, the disclosures of which are incorporated herein by reference.

Carrying case 10 includes a handle 76 by which the carrying case can be manually picked up and carried by one hand. The handle 76, as best shown in FIGS. 1, 3 and 7–10, comprises first and second handle portions 78 and 79, respectively, secured on opposite sides of the primary opening, i.e. on opposite sides of zipper 20. The first and second handle portions 78 and 79 have arcuate segments 80 and 84, respectively, rotatably or pivotably mounted on the enclosure formed by the front wall, back wall, top and bottom side walls and left and right side walls 12, 14, 16, 17, 18 and 19. In the case of carrying case 10, the handle portions are mounted centrally along top segments of perimetrical edges 23. The first handle portion 78 has arcuate segment 80 and a straight segment 81 joined to opposite ends 82 of the arcuate segment 80 to form a first loop. Second handle portion 79 similarly has arcuate segment 84 and a straight segment 85 joined to opposite ends 86 of the arcuate segment 84 to form a second loop. The straight segments 81 and 85, which have a cylindrical configuration, extend through sleeve formations 87, respectively, on the top segments of perimetrical edges 23, respectively. The straight segments 81 and 85 are rotatable within the sleeve formations 87, allowing each handle portion 78 and 79 to pivot or rotate about the central longitudinal axis of its straight segment as shown by arrows in FIG. 7. The central longitudinal axes of the straight segments thusly define parallel axes about which the arcuate segments 80 and 84, respectively, are rotatable relative to the top side wall 16.

Figure 15:
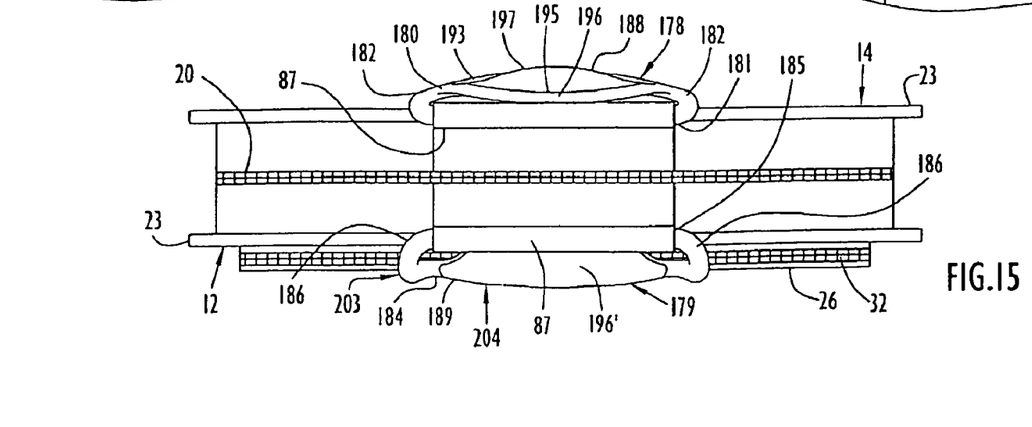
FIG. 15 is a top view of the carrying case incorporating the preferred handle and illustrating the first and second handle portions rotated downwardly as far as possible toward the back and front walls, respectively, of the carrying case.

The first and second handle portions 78 and 79 are pivotable or rotatable from an engaged position wherein the arcuate segments 80 and 84 are in mating engagement with one another, as shown in FIGS. 1–3 and 7–9, to a disengaged position wherein the arcuate segments 80 and 84 are separated, disengaged or spaced from one another. In the engaged position, the handle portions are angled toward one another and are in an upstanding position or orientation with the first and second loops defined thereby cooperating to form a grip by which the handle can be manually grasped with a single hand in order to pick up or carry the carrying case. In the disengaged position, which would involve rotation of first handle portion 78 counterclockwise, i.e. downwardly toward the back wall 14, and rotation of second handle portion 79 clockwise, i.e. downwardly toward the front wall 12, looking at FIG. 7, the arcuate segments 80 and 84 are moved away from one another creating a space between the first and second handle portions facilitating access to the primary opening and, therefore, the interior of the carrying case 10. When the first and second handle portions are rotated downwardly counterclockwise and clockwise, respectively, as far as possible, the arcuate segments 80 and 84 will be disposed alongside or flush with the back wall 14 and front wall 12, respectively, as shown in FIG. 15 for the handle portions of the preferred handle 176.

Figure 7:
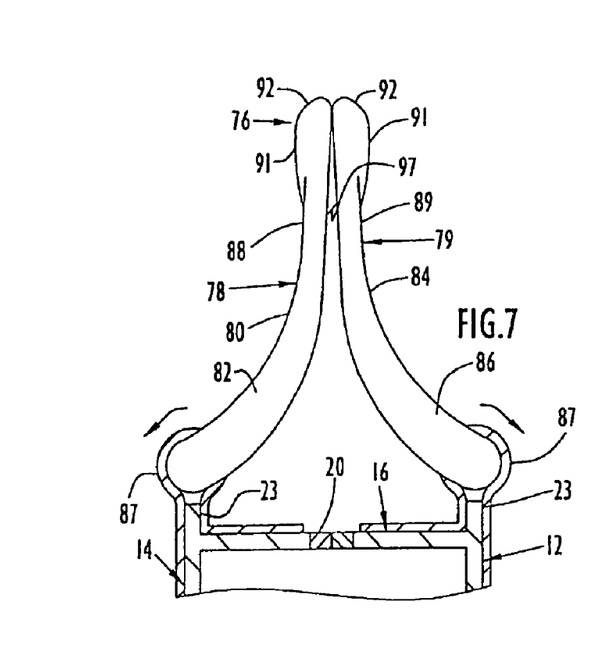
FIG. 7 is a broken side view, partly in section, of the carrying case depicting a handle thereof in an upstanding and engaged position with first and second handle portions of the handle in cooperative mating engagement.
Figure 8:
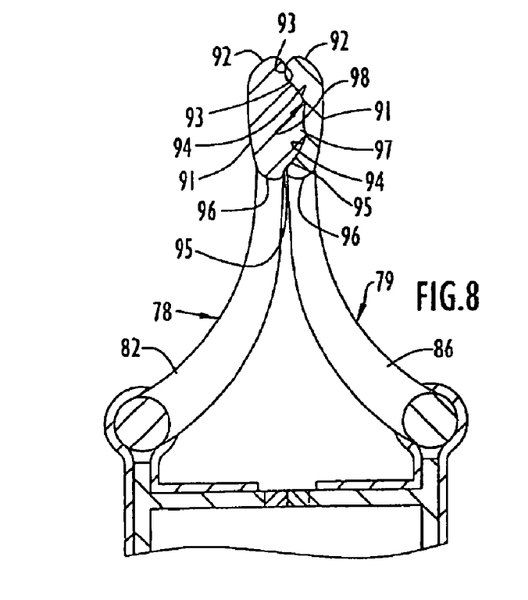
FIG. 8 is a broken side view, partly in section, of the carrying case showing cooperative mating engagement of the first and second handle portions.

As shown in FIGS. 7 and 8, ends 82 curve inwardly, i.e. in the direction of the primary opening, and upwardly from the straight segments 81 to merge with a central portion 88 of arcuate segment 80 in the upstanding, engaged position for the handle portion 78. Ends 86 curve inwardly, i.e. in the direction of the primary opening, and upwardly from the straight segment 85 to merge with a central portion 89 of arcuate segment 84 that mates with central portion 88 in the upstanding, engaged position. The ends 82 and 86 continuously curve or extend from their straight segments at approximately a 45 20 angle to the central longitudinal axes of the straight segments, the ends 86 being symmetrical with the ends 82. The central portions of arcuate segments 80 and 84 each include an outwardly or convexly curved or rounded outer surface 91, an outwardly or convexly curved or rounded top surface 92 merging with the outer surface 91, an outwardly or convexly curved or rounded upper transition surface 93 merging with the top surface 92, an inner surface 94 merging with upper transition surface 93, an outwardly or convexly curved or rounded lower transition surface 95 merging with inner surface 94 and an outwardly or convexly curved or rounded bottom surface 96 (shown in FIGS. 8 and 10) merging with lower transition surface 95 and outer surface 91. The central portions 88 and 89 of arcuate segments 80 and 84, respectively, are of greater height and width than ends 82 and 86, the central portions 88 and 89 tapering in height and width in the direction of ends 82 and 86, respectively, which taper in height to straight segments 81 and 85, respectively. As shown in FIG. 1 for handle portion 79, the outer surfaces 91 are each preferably formed of convexly or outwardly curved or rounded upper and lower outer surface segments 91a and 91b, respectively, joining one another at an arcuately extending junction 101 facilitating manual gripping. The upper transition surface 93 of handle portion 78 extends in a continuous or unbroken arcuate path along the central portion 88, and the upper transition surface 93 of handle portion 79 similarly extends in a continuous or unbroken arcuate path along the central portion 89 as shown for handle portion 78 in FIG. 10. The arcuate paths for upper transition surfaces 93 are the same, and the upper transition surfaces 93 meet and abut one another in the engaged position. The outer surface 91, the top surface 92, the upper transition surface 93, the lower transition surface 95 and the bottom surface 96 of handle portion 78 are symmetrical with the corresponding surfaces of handle portion 79. Accordingly, when the first and second handle portions are in the engaged position, the central portions 88 and 89 cooperate to form or define a smooth, symmetrical grip conducive to grasping and presenting an attractive appearance.

The inner surfaces 94 are disposed between the upper and lower transition surfaces 93 and 95, respectively. The inner surfaces 94 have different but complementary configurations that mate or interengage when the first and second handle portions are pivotally moved to the upstanding, engaged position. The inner surface 94 of first handle portion 78 is formed by a protuberance or protrusion 97 defining an outwardly or convexly curved or rounded surface. The protrusion 97 curves outwardly from the upper and lower transition surfaces of the first handle portion 78 and tapers in height and width in the direction of ends 82 to merge with the inner surfaces of ends 82. The inner surface 94 of second handle portion 79 is formed by a recess or cavity 98 curving or extending inwardly from the corresponding upper and lower transition surfaces 93 and 95. The cavity 98 is defined by an inwardly or concavely curved surface complementary to the outwardly curved surface of protrusion 97 and tapers in height and width in the direction of ends 86 to merge or blend in with the inner surfaces of ends 86. When the first and second handle portions are pivoted or rotated from a disengaged position to bring upper transition surfaces 93 into abutment, the protrusion 97 enters and is received in the cavity 98 as a result of such pivotal movement or rotation.

In the engaged position, the protrusion 97 is received in the cavity 98 so that the central portions 88 and 89 cooperate to form a smooth, symmetrical configuration facilitating grasping and providing a pleasing appearance. The handle 76 will normally be grasped by inserting four fingers, excluding the thumb, of one hand through the first and second loops and curling the fingers around the engaged central portions 88 and 89 so that the bottom surfaces 96 are supported on the undersides of the curled fingers. Engagement of the protrusion 97 with the cavity 98 resists rotation or pivotal movement of the handle portions 78 and 79 from the engaged position to a disengaged portion such that the handle portions tend to remain engaged and upstanding when the carrying case 10 is positioned in the upright position on a support surface. Accordingly, the handle 76 will typically be ready for manual grasping without first having to move the individual handle portions to the engaged and upstanding position, thusly enhancing ease of use. The protrusion adds rigidity to handle portion 78 and also to the handle when the handle portions are in the engaged position, thereby enhancing structural integrity and promoting even weight distribution on the hand even when the carrying case is heavy due to its contents. The curvature or roundness of the bottom surfaces 96, which are supported on the undersides of the curled fingers of a hand grasping the grip formed by the engaged central portions, provide a smooth feel and enhanced comfort for the hand grasping the handle. The handle portions 78 and 79 can be made of various materials, such as durable plastic, and the handle portions can be rigid, semi-rigid or somewhat flexible, allowing the handle portions to flex as needed to accommodate variations in the width of the enclosure in accordance with the proportion of the interior volume that is occupied or filled by objects or other contents. The handle portions can be made in various ways including various molding processes.

Figure 9:
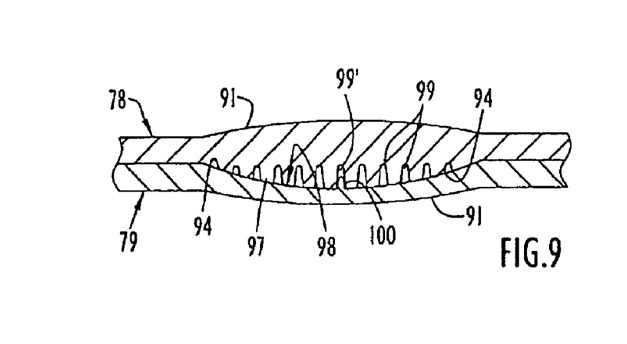
FIG. 9 is a broken, top sectional view of the handle depicting cooperative mating engagement of the first and second handle portions.
Figure 10:
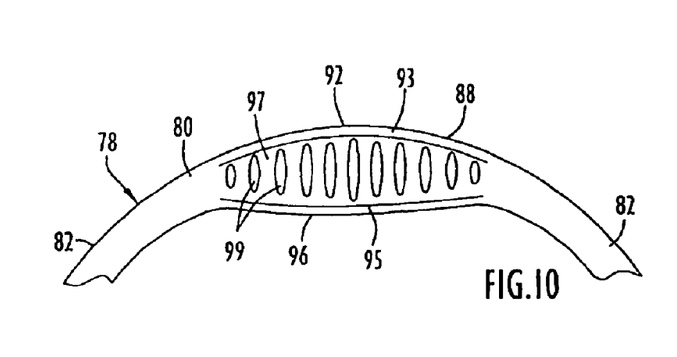
FIG. 10 is a broken front view of a first handle portion of the handle.

The protrusion 97 can optionally have one or more vertically extending slots or grooves 99 therein, which can serve to reduce weight and needed material. A centrally located slot 99' can receive a centrally located, vertically extending protruding finger 100 provided or formed on the inner surface 94 of handle portion 79 as shown in FIG. 9. The finger 100 automatically enters slot 99' as the handle portions are moved to the engaged position, engagement of finger 100 in slot 99' providing further resistance to separation of the handle portions. Entry of finger 100 into slot 99' is insured since the protrusion 97 and cavity 98 provide a self-centering or self-aligning effect when the handle portions are moved to the engaged position.

FIGS. 11–15 illustrate another, and preferred, handle 176 for use on carrying cases for portable computers and, in particular, carrying case 10. The handle 176 includes first and second handle portions 178 and 179 having arcuate segments 180 and 184, respectively, mounted for rotation relative to the top side wall 16 as described for handle 76. The first handle portion 178 has arcuate segment 180 and straight segment 181 joined to continuously curving opposite ends 182 of arcuate segment 180 to form a first loop. The second handle portion 179 has arcuate segment 184 and straight segment 185 joined to continuously curving opposite ends 186 of arcuate segment 184 to form a second loop. The straight segments 181 and 185 are mounted in sleeve formations 87, allowing the first and second handle portions to rotate or pivot about parallel axes between an engaged, upstanding position and a disengaged position as described for handle 76. The arcuate segments 180 and 184 have central portions 188 and 189, respectively, that abut and mate with one another in the engaged position. The ends 182 and 186 of arcuate segments 180 and 184, respectively, curve inwardly and upwardly from the straight segments 181 and 185, respectively, to merge with the central portions 188 and 189, respectively, as described for handle 76.

Figure 11:
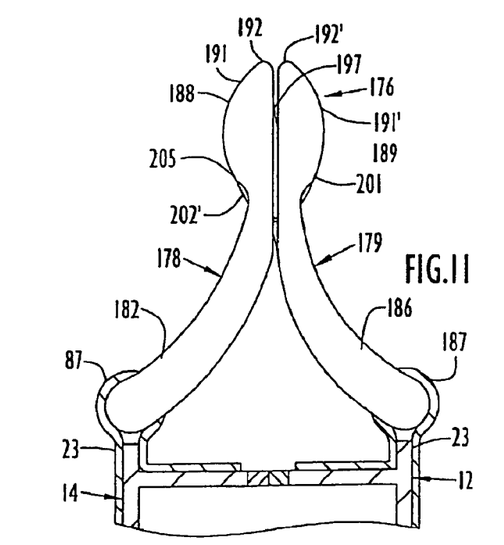
FIG. 11 is a broken side view, partly in section, of an alternative and preferred handle for the carrying case and depicting the alternative handle in the upstanding and engaged position with first and second handle portions of the alternative handle in cooperative mating engagement.
Figure 12:
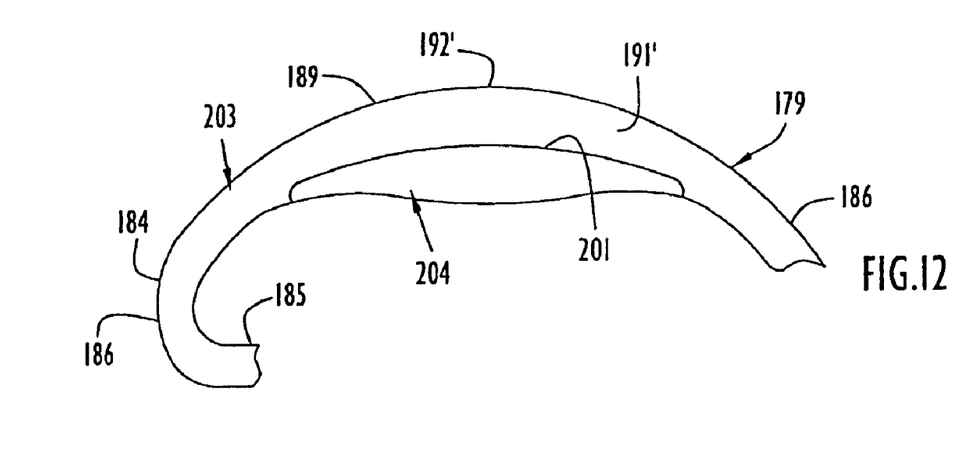
FIG. 12 is a broken front view of the second handle portion of the preferred handle.

As best shown in FIGS. 11 and 12, the central portion 188 includes an outwardly or convexly curved or rounded outer surface 191, an outwardly or convexly curved or rounded top surface 192 merging with the outer surface 191, an outwardly curved or rounded upper transition surface 193 merging with the top surface 192, an inner surface 194 merging with the upper transition surface 193, an outwardly curved or rounded lower transition surface 195 merging with the inner surface 194 and an outwardly curved or rounded bottom surface 196 merging with lower transition surface 195 and outer surface 191. The outer surface 191 defines an upper outer surface segment of the grip formed when the central portions 188 and 189 are engaged, with the outer surface of the grip being completed by a surface of handle portion 179 when the handle portions 178 and 179 are in the engaged position as explained further below. The central portion 189 includes an outwardly or convexly curved or rounded outer surface 191', an outwardly or convexly curved or rounded top surface 192' merging with the outer surface 191', an outwardly curved or rounded upper transition surface 193' merging with the top surface 192', an inner surface 194' merging with upper transition surface 193', a lower transition surface 195' merging with inner surface 194', an outwardly curved or rounded outer surface 202' merging with lower transition surface 195', and an outwardly curved or rounded bottom surface 196' merging with outer surface 202' and outer surface 191'. The central portions 188 and 189 are of greater height and width than ends 182 and 186, the central portions 188 and 189 tapering in height and width in the direction of ends 182 and 186, respectively, which taper in height to straight segments 181 and 185, respectively. The outer surface 202' cooperates with the outer surface 191 to complete the outer surface of the grip formed by engaged central portions 188 and 189 as described below.

Figure 13:
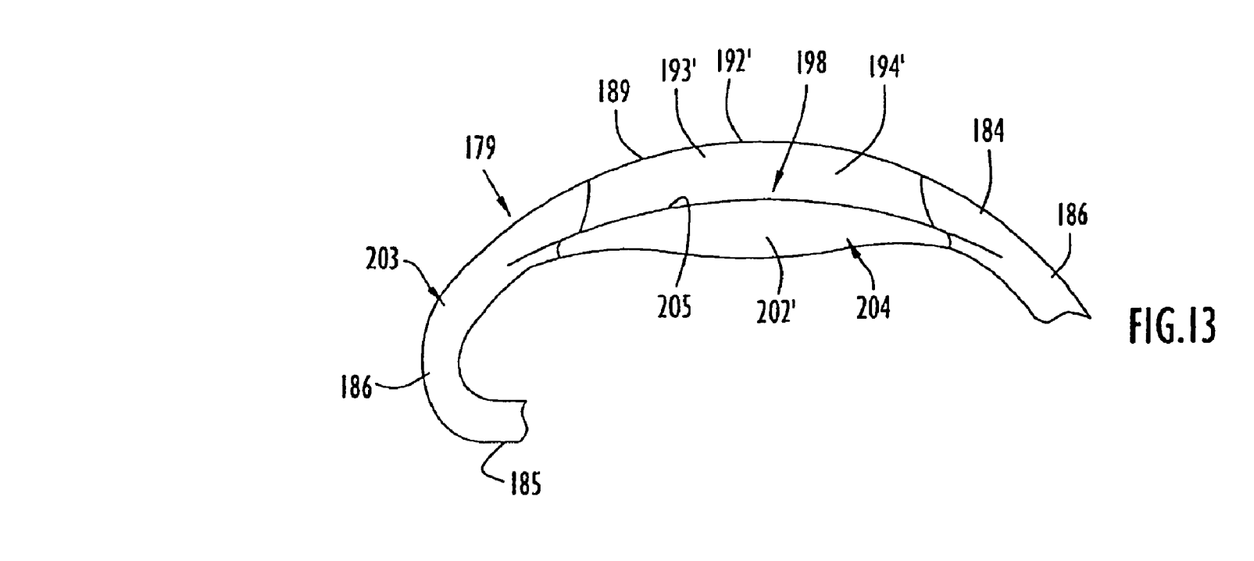
FIG. 13 is a broken rear view of the second handle portion of FIG. 12.

The second handle portion 179 is formed of two sections or parts, i.e. a primary handle section 203 and a secondary handle section 204, of different hardnesses or rigidities. The handle section 204 defines the outer surface 202', the bottom surface 196' and a lower outer surface segment of the outer surface 191'. As shown in FIG. 12, the handle section 204 has an arcuately extending edge forming a junction 201 at which the handle section 204 meets an arcuately extending edge of outer surface 191'. The junction 201 extends lengthwise along the central portion 189, and is located about halfway up the height of the central portion 189 as shown in FIG. 12. The handle section 204 has a corresponding arcuately extending edge 205 on the opposite side thereof, the edge 205 being a terminal edge of outer surface 202'. The edge 205 extends lengthwise along the central portion 189, and is located about halfway up the height of the central portion 189 as shown in FIG. 13. The first handle portion 178 and the primary section 203 of second handle portion 179 are made of TPE material of 85 durometer. The secondary handle section 204 is made of TPE material of 40 durometer. The handle portions 178 and 179 can be made in various ways including various molding processes. The primary and secondary handle sections 203 and 204 can be made integrally, unitarily or as separate parts. Where the primary and secondary handle sections are formed as separate parts, such parts can be assembled and secured in various ways including the use of heat welding and/or adhesives.

The upper transition surfaces 193 and 193' extend in continuous or unbroken arcuate paths along the central portions 188 and 189, respectively, with the arcuate paths for the upper transition surfaces being the same. Accordingly, the upper transition surfaces 193 and 193' meet to form a smooth, even seam when the upper transition surfaces 193 and 193' are in abutment in the engaged position for handle 176. The outer surface 202' has a curvature to cooperate with the curvature of outer surface 191 to form or complete an outer surface having the same or substantially the same curvature as outer surface 191' as explained further below. The outer surface 191 meets the bottom surface 196 at an arcuately extending lower edge adapted to abut edge 205 when the handle portions mate in the engaged position.

The inner surfaces 194 and 194' have different but complementary configurations that mate or interengage when the first and second handle portions are pivotably or rotatably moved to the upstanding, engaged position. The inner surface 194 of first handle portion 178 is formed by a protuberance or protrusion 197 extending outwardly from the upper transition surface 193, with the protuberance 197 curving upwardly along its bottom to meet the lower transition surface 195. The protuberance 197 tapers in height and width to merge with the inner surfaces of ends 182. The lower transition surface 195 forms a rounded lip extending lengthwise along the protuberance 197. The inner surface 194' of second handle portion 179 is formed by a recess or cavity 198 curving inwardly from the rounded upper transition surface 193'. The cavity 198 is defined by an inwardly or concavely curved surface complementary to the outwardly-curved surface of protrusion 197. The cavity 198 tapers in height and width to merge or blend in with the inner surfaces of ends 186. The lower transition surface 195' has an inwardly or concavely curved configuration forming a groove for receiving the lip formed by the lower transition surface 195. The groove formed by lower transition surface 195' extends along the edge 205 of handle section 204, and the groove tapers at opposite ends to merge or blend into the inner surface of arcuate portion 184.

Figure 14:
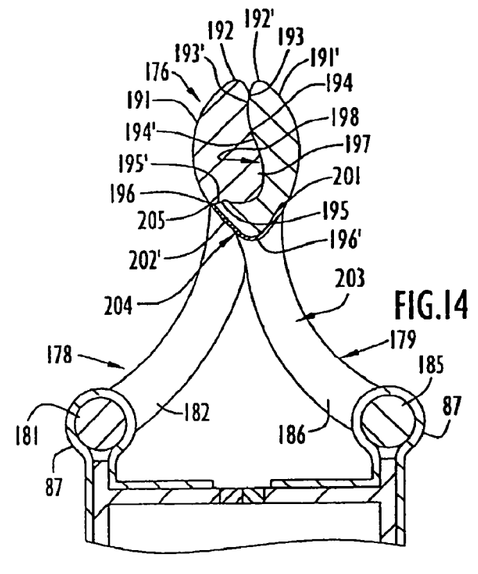
FIG. 14 is a broken side view, partly in section, of the alternative handle showing cooperative mating engagement of the first and second handle portions.

In the engaged position for handle 176, the protuberance 197 is received in the cavity 198, and the outer surface 202' of second handle portion 179 cooperates with the outer surface 191 of first handle portion 178 to form a larger or completed outer surface symmetrical with the outer surface 191'. The outer surface 191' has an upper outer surface segment formed by a surface of primary handle section 203 and a lower outer surface segment formed by a surface of handle section 204. The completed outer surface similarly has an upper outer surface segment formed by outer surface 191 and a lower outer surface segment formed by a surface of handle section 204 and, in particular, outer surface 202'. The edge 205 of outer surface 202' meets or abuts the lower edge formed by the juncture of outer surface 191 with bottom surface 196. The seam or junction formed by abutment or adjacent disposition of edge 205 with the lower edge of outer surface 191 corresponds in location, feel and appearance to the junction 201 on the outer surface 191 thusly providing visual and tactile symmetry. The lip formed by the lower transition surface 195 is disposed in the groove formed by the lower transition surface 195'. Since the inner surface 194' defining the cavity 198 curves downwardly from the lower transition surface 195' as shown in FIG. 14, disengagement of protuberance 197 from cavity 198 is resisted and the handle 176 will tend to remain in the engaged position.

The bottom surface 196' of second handle portion 179 defines and forms the bottom surface of the grip formed by the central portions of arcuate segments 180 and 184, respectively, in the engaged position. Accordingly, no seam or other discontinuous junction is presented along the bottom surface of the grip since the handle section 204 overlaps the bottom of handle portion 178. Therefore, when the grip formed by the abutting central portions of arcuate segments 180 and 184 is grasped with one hand, the bottom surface 196' is supported on the undersides of the fingers of the hand. Since the bottom surface 196' is unbroken, smooth and continuous, greater comfort is experienced by the user particularly when the carrying case is to be carried or transported manually for relatively long periods of time. The relatively greater hardness of handle section 204, which forms bottom surface 196', adds structural strength and integrity to the handle as well as promotes weight distribution over the entire hand, even when the carrying case is heavy due to the weight of its contents. Also, the increased structural rigidity provided by handle section 204 provides a shape maintaining effect, in that the handle 176 remains ergonomic during use even when the carrying case is heavy and/or when the contents thereof are not uniformly distributed in the interior. In particular, the outer sides of the index finger and pinkie are not subject to weight or pressure since the shape of the bottom surface 196' is maintained even when carrying heavy loads. The relatively softer handle portion 178 and handle section 203, which are contacted and felt by the hand used to grasp the handle 176, provide greater comfort for the hand.

The handle 176 is moved to the engaged position in a manner similar to that described for handle 76. However, depending on how the arcuate segments 180 and 184 are mounted to the enclosure, the first handle portion 178 may have to be lifted or moved upwardly slightly to facilitate entry of protuberance 197 into cavity 198. Typically, as the first and second handle portions are rotated to bring the transition surfaces 193 and 193' into abutment, the protuberance 197 engages the edge 205 and is automatically guided by the lower transition surface 195' into the cavity 198. Once the first and second handle portions are in the engaged position, movement of the first and second handle portions to a disengaged position is resisted. When the first and second handle portions 178 and 179 are manually rotated downwardly toward the front and back walls 12 and 14, respectively, as far as possible, the curvature and angle of the ends 182 and 186 of arcuate segments 180 and 184, respectively, enable the arcuate segments 180 and 184 to lie close to, flush with or alongside the front and back walls 12 and 14, respectively, as shown in FIG. 15. Accordingly, the carrying case 10 has a smooth, slender profile even when the first and second handle portions are rotated downwardly the maximum amount.

In the carrying case described and illustrated herein, the computer receiving compartment is defined between the floating wall and a fixed wall surface defined by an exterior wall of the carrying case. It should be appreciated, however, that the computer receiving compartment can be defined between opposed floating panels, and that the wall surface can be defined by an exterior or interior wall of the carrying case. Adjustment of the width of the computer receiving compartment is achieved via linear movement of the floating panel in a direction perpendicular to the wall surface. Movement of the floating panel outwardly from the wall surface is limited by the connecting members to establish a maximum width for the computer receiving compartment. The connecting members can be designed in many various ways to connect the floating panel to the wall surface while permitting the entire floating panel to move linearly relative to the wall surface. Depending on the design of the connecting members, the connecting members can serve as the securing members and vice versa. Since the bottom edge of the floating panel is spaced only a small distance from the bottom side wall, objects placed in the storage compartment are prevented from entering the computer receiving compartment. The handle for the carrying case is ergonomically designed to enhance use and comfort and to reduce fatigue for a user. Although the carrying case is described herein primarily for use with portable computers, such as laptop or notebook computers, it should be appreciated that the carrying case can be used to transport various types of electronic instruments or equipment and to protect such electronic instruments or equipment during transport.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A carrying case comprising:
    an enclosure defining an interior and having a substantially planar front wall, a substantially planar back wall, and an opening that provides access to said interior; and
    a handle including first and second handle portions each comprising a first segment rotatably mounted on said enclosure on opposite sides of said opening, respectively, and a second segment connecting opposite ends of said first segment, said second segments having central longitudinal axes, respectively, defining parallel axes about which said first segments are rotatable, respectively, for movement between an engaged position, wherein said first segments are in abutment, and a fully disengaged position, wherein said first segments are separated from one another,
    said first segments having mating surfaces, respectively, of complementary configurations to mate in said engaged position, wherein the ends of each of said first segments form a continuous curve beginning at the ends of said second segments and ending at said mating surfaces, and wherein said curve has a substantially concave curvature relative to a vertical plane extending from said opening through said mating surfaces in said engaged position.

2. The carrying case of claim 1, wherein said opening is selectively openable and selectively closable.

3. The carrying case of claim 1, wherein said opening comprises a zippered opening.

4. The carrying case of claim 1, wherein said first segments comprise arcuate segments, respectively, and said second segments comprise straight segments, respectively.

5. The carrying case of claim 1, wherein said mating surfaces comprise inner surfaces, respectively, of said first segments.

6. The carrying case of claim 5, wherein said first segments have top surfaces, respectively, joined to said inner surfaces and forming lips, respectively, where said top surfaces join said inner surfaces, said lips being in abutment when said handle portions are in said engaged position.

7. The carrying case of claim 1, wherein said mating surface of said first handle portion is configured as a protuberance and said mating surface of said second handle portion is configured as a cavity for receiving said protuberance.

8. The carrying case of claim 7, wherein said protuberance has a substantially convex curvature and said cavity has a substantially concave curvature resisting disengagement of said first and second handle portions from said engaged position.

9. The carrying case of claim 7, wherein said protuberance is substantially convexly curved and tapers in height and width in the direction of said ends of said first segment of said first handle portion.

10. The carrying case of claim 1, wherein said ends of each of said first segments curve from said second segments, respectively, at about a 45° angle in a direction towards said vertical plane in said engaged position.

11. The carrying case of claim 1, wherein said second segments are mounted within sleeve formations on said enclosure.

12. A carrying case comprising:
    an enclosure defining an interior and having a front and back wall and an opening that provides access to said interior; and
    a handle including first and second handle portions each comprising a first segment rotatably mounted on said enclosure on opposite sides of said opening, respectively, and a second segment connecting opposite ends of said first segment, said second segments having central longitudinal axes, respectively, defining parallel axes about which said first segments are rotatable, respectively, for movement between an engaged position, wherein said first segments are in abutment, and a fully disengaged position, wherein said first segments are separated from one another,
    said first segments having mating surfaces, respectively, configured to mate in said engaged position, said mating surface of said first handle portion being configured as a protuberance and said mating surface of said second handle portion being configured as a cavity for receiving said protuberance in said engaged position, wherein the ends of each of said first segments form a continuous curve beginning at the ends of said second segments and ending at said mating surfaces, and wherein said curve has a substantially concave curvature relative to a vertical plane extending from said opening through said mating surfaces in said engaged position.

13. The carrying case of claim 12, wherein said opening is selectively openable and selectively closable.

14. The carrying case of claim 12, wherein said first segments comprise arcuate segments, respectively, and said second segments comprise straight segments, respectively.

15. The carrying case of claim 12, wherein said mating surfaces comprise inner surfaces, respectively, of said first segments.

16. The carrying case of claim 15, wherein said first segments have top surfaces, respectively, joined to said inner surfaces and forming lips, respectively, where said top surfaces join said inner surfaces, said lips being in abutment when said handle portions are in said engaged position.

17. The carrying case of claim 12, wherein said protuberance has a substantially convex curvature and said cavity has a substantially concave curvature resisting disengagement of said first and second handle portions from said engaged position.

18. The carrying case of claim 12, wherein said protuberance is substantially convexly curved and tapers in height and width in the direction of said ends of said first segment of said first handle portion.

19. The carrying case of claim 12, wherein said ends of each of said first segments curve from said second segments, respectively, at about a 45° angle in a direction towards said vertical plane in said engaged position.

20. The carrying case of claim 12, wherein said second segments are mounted within sleeve formations on said enclosure.

21. A carrying case comprising
an enclosure defining an interior and having a front wall, back wall, and a zippered opening permitting access to said interior; and
a handle including first and second handle portions each comprising a first segment rotatably mounted on said enclosure on opposite sides of said opening, respectively, and a second segment connecting opposite ends of said first segment, said second segments having central longitudinal axes, respectively, defining parallel axes about which said first segments are rotatable, respectively, for movement between an engaged position, wherein said first segments are in abutment, and a fully disengaged position, wherein said first segments are separated from one another,
said first segments each having mating means, respectively, for mating in said engaged position, wherein the ends of each of said first segments form a continuous curve beginning at the ends of said second segments and ending at said mating surfaces, and wherein said curve has a substantially concave curvature relative to a vertical plane extending from said opening through said mating surfaces in said engaged position.

22. The carrying case of claim 21, wherein said first segments comprise arcuate segments, respectively, and said second segments comprise straight segments, respectively.

23. The carrying case of claim 21, wherein said mating means of said first and second handle portions each comprise mating surfaces, respectively, of complementary configurations to mate in said engaged position.

24. The carrying case of claim 23, wherein said mating surfaces comprise inner surfaces, respectively, of said first segments.

25. The carrying case of claim 24, wherein said first segments have top surfaces, respectively, joined to said inner surfaces and forming lips, respectively, where said top surfaces join said inner surfaces, said lips being in abutment when said handle portions are in said engaged position.

26. The carrying case of claim 23, wherein said mating surface of said first handle portion is configured as a protuberance and said mating surface of said second handle portion is configured as a cavity for receiving said protuberance.

27. The carrying case of claim 26 wherein said protuberance has a substantially convex curvature and said cavity has a substantially concave curvature resisting disengagement of said first and second handle portions from said engaged position.

28. The carrying case of claim 26, wherein said protuberance is substantially convexly curved and tapers in height and width in the direction of said ends of said first segment of said first handle portion.

29. The carrying case of claim 21, wherein said ends of each of said first segments curve from said second segments, respectively, at about a 45° angle in a direction towards said vertical plane in said engaged position.

30. The carrying case of claim 21, wherein said second segments are mounted within sleeve formations on said enclosure.

31. A handle for a carrying case that includes an enclosure defining an interior and having a front wall, a back wall, and an opening that provides access to the interior, the handle comprising:
first and second handle portions each comprising a first segment adapted for rotatable mounting on the enclosure on opposite sides of the opening, respectively, and a second segment connecting opposite ends of said first segment, said second segments having central longitudinal axes, respectively, adapted to define parallel axes about which said first segments are rotatable, respectively, for movement between an engaged position, wherein said first segments are in abutment, and a fully disengaged position, wherein said first segments are separated from one another,
said first segments having mating surfaces, respectively, of complementary configurations to mate in said engaged position, wherein the ends of each of said first segments form a continuous curve beginning at the ends of said second segments and ending at said mating surfaces, and wherein said curve has a substantially concave curvature relative to a vertical plane extending from said opening through said mating surfaces in said engaged position.

32. The handle of claim 31, wherein said first segments comprise arcuate segments, respectively, and said second segments comprise straight segments, respectively.

33. The handle of claim 31, wherein said mating surfaces comprise inner surfaces, respectively of said segments.

34. The handle of claim 33, wherein said first segments have top surfaces, respectively, joined to said inner surfaces and forming lips, respectively, where said top surfaces join said inner surfaces, said lips being in abutment when said handle portions are in said engaged position.

35. The handle of claim 31, wherein said mating surface of said first handle portion is configured as a protuberance and said mating surface of said second handle portion is configured as a cavity for receiving said protuberance.

36. The handle of claim 35, wherein said protuberance has a substantially convex curvature and said cavity has a substantially concave curvature resisting disengagement of said first and second handle portions from said engaged position.

37. The handle of claim 35, wherein said protuberance is substantially convexly curved and tapers in height and width in the direction of said ends of said first segment of said first handle portion.

38. The handle of claim 31, wherein said ends of each of said first segments curve from said second segments, respectively, at about a 45° angle in a direction towards said vertical plane in said engaged position.

39. The handle of claim 31, wherein said second segments are adapted for mounting within sleeve formations on the enclosure.

* * * * *